(12) United States Patent
Lin et al.

(10) Patent No.: US 9,052,424 B2
(45) Date of Patent: Jun. 9, 2015

(54) BACKLIGHT MODULE

(71) Applicants: Yang-Ching Lin, Hsin-Chu (TW);
Tzeng-Ke Shiau, Hsin-Chu (TW)

(72) Inventors: Yang-Ching Lin, Hsin-Chu (TW);
Tzeng-Ke Shiau, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 188 days.

(21) Appl. No.: 13/727,130

(22) Filed: Dec. 26, 2012

(65) Prior Publication Data
US 2013/0170247 A1 Jul. 4, 2013

(30) Foreign Application Priority Data

Dec. 30, 2011 (CN) .......................... 2011 1 0454309

(51) Int. Cl.
F21V 7/04 (2006.01)
F21V 8/00 (2006.01)

(52) U.S. Cl.
CPC ............ G02B 6/0043 (2013.01); G02B 6/0053 (2013.01)

(58) Field of Classification Search
USPC ......... 362/600, 606, 607, 615, 617, 619, 620, 362/623, 625, 626, 628
See application file for complete search history.

(56) References Cited

U.S. PATENT DOCUMENTS

| | | | |
|---|---|---|---|
| 7,108,415 B2 | 9/2006 | Hayakawa | |
| 2004/0076396 A1 | 4/2004 | Suga | |
| 2007/0242479 A1* | 10/2007 | Ohta et al. | 362/627 |
| 2010/0182799 A1* | 7/2010 | Tanahashi | 362/606 |

FOREIGN PATENT DOCUMENTS

| | | |
|---|---|---|
| CN | 101718887 A | 6/2010 |
| CN | 101737726 A | 6/2010 |
| CN | 102116891 A | 7/2011 |
| JP | 2001228424 A | 8/2001 |
| JP | 2007305544 A | 11/2007 |
| KR | 10-20080046313 A | 5/2008 |
| KR | 10-20080113887 A | 12/2008 |
| TW | 200732785 | 9/2007 |
| TW | 201007233 A | 2/2010 |
| VA | 201015129 | 4/2010 |

* cited by examiner

Primary Examiner — Anh Mai
Assistant Examiner — Zachary J Snyder
(74) Attorney, Agent, or Firm — Muncy, Geissler, Olds & Lowe, P.C.

(57) ABSTRACT

A backlight module includes at least one light source and a light guide plate. The light guide plate includes at least one light incident surface, a light-emitting surface, a bottom surface, a plurality of lenticular lenses and a plurality of micro dots. The light incident surface is disposed adjacent to the light source, and the light-emitting surface is connected with the light incident surface and forms an angle with the light incident surface. The bottom surface is connected with the light incident surface and disposed opposite the light-emitting surface. The lenticular lenses are arranged on the light-emitting surface in a direction substantially parallel to the light incident surface, and the micro dots are formed on at least the bottom surface. The invention provides a backlight module having high directionality of light propagation and high light-utilization efficiency.

10 Claims, 7 Drawing Sheets a maximum width of a light-emitting area of the light source measured in a direction parallel to the light incident surface is denoted as W, the light guide plate satisfies the following relation:

$$0.5 \le (P/\psi) \le 15; \text{ and}$$

$$5 \le (W/P) \le 500.$$

In one embodiment, an included angle made by the extending direction of each of the lenticular lenses and a light-emitting direction of the light source is smaller than 10 degrees.

In one embodiment, a height of each of the micro dots relative to the bottom surface is denoted as h, and the light guide plate satisfies the following relation:

$$0.08 \le (h/\psi) \le 0.4.$$

In one embodiment, a surface roughness of the lenticular lenses is smaller than or equal to 0.1 um, and a surface roughness of the micro dots is smaller than or equal to 0.09 um.

In one embodiment, the micro dots may include ink-jet printing dots or laser-transferring printing dots.

In one embodiment, a diffusion angle of the light beam propagating in the light guide plate and emitted by the light source is smaller than 45 degrees.

In one embodiment, each of the lenticular lenses has an arc-shaped cross-section.

In one embodiment, the distribution densities of the micro dots in different areas of the bottom surface are distinct from each other.

In one embodiment, a distance between two adjacent lenticular lenses is measured between respective apexes of the two adjacent lenticular lenses.

In conclusion, the backlight module of the embodiments of the invention may have at least one of the following advantages.

According to the above embodiments, multiple lenticular lenses arranged on the light-emitting surface extend in a light-emitting direction of the light source, and the micro dots are formed by ink-jet printing or laser-transferring printing to provide smoother light-deflection surfaces. Therefore, the directionality of light propagating in the light guide plate is enhanced to reduce light scattering. Under the circumstance, emission of the light source is mostly confined to the front of the light source to reduce the amount of light scattering through sides of the light guide plate and therefore increase light-utilization efficiency. Further, since the directionality of light propagating in the light guide plate is improved to enhance effects of local dimming, the luminance uniformity and image contrast are further increased.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
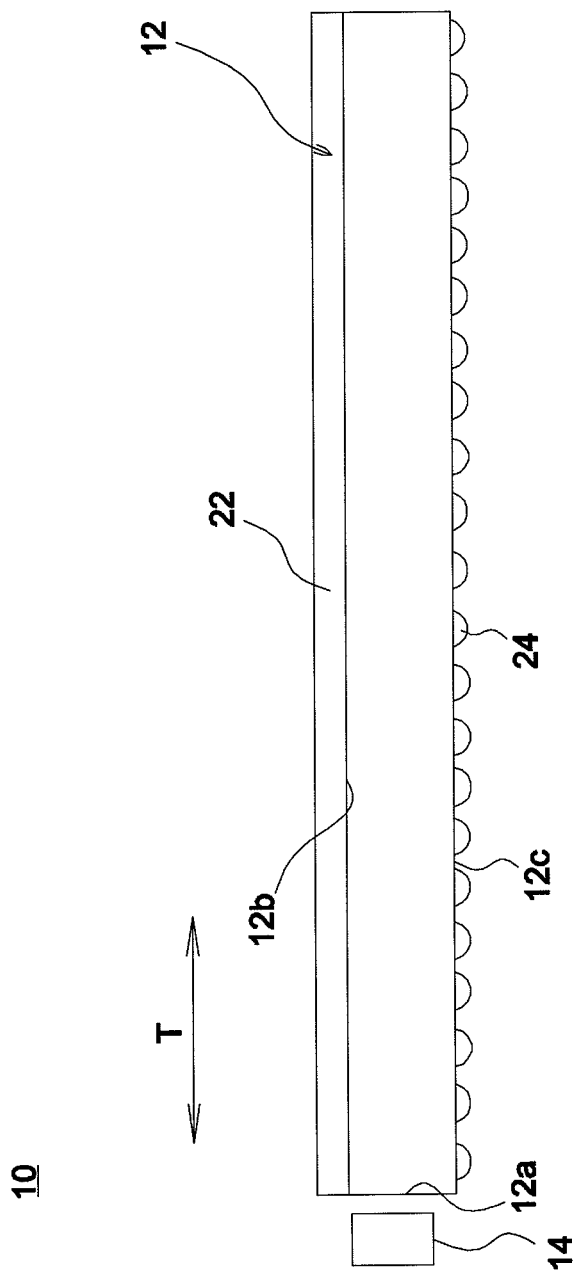
FIG. 1 shows a schematic side view of a backlight module according to an embodiment of the invention.
Figure 2:
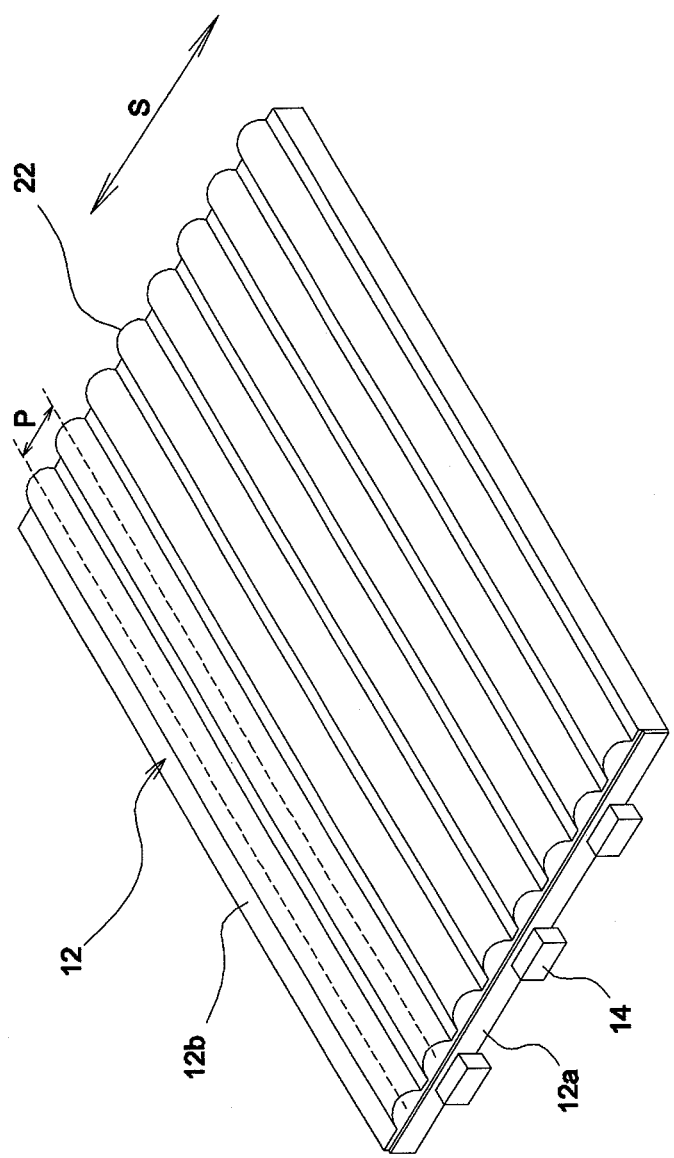
FIG. 2 shows a three-dimensional diagram of a backlight module according to an embodiment of the invention.
Figure 3:
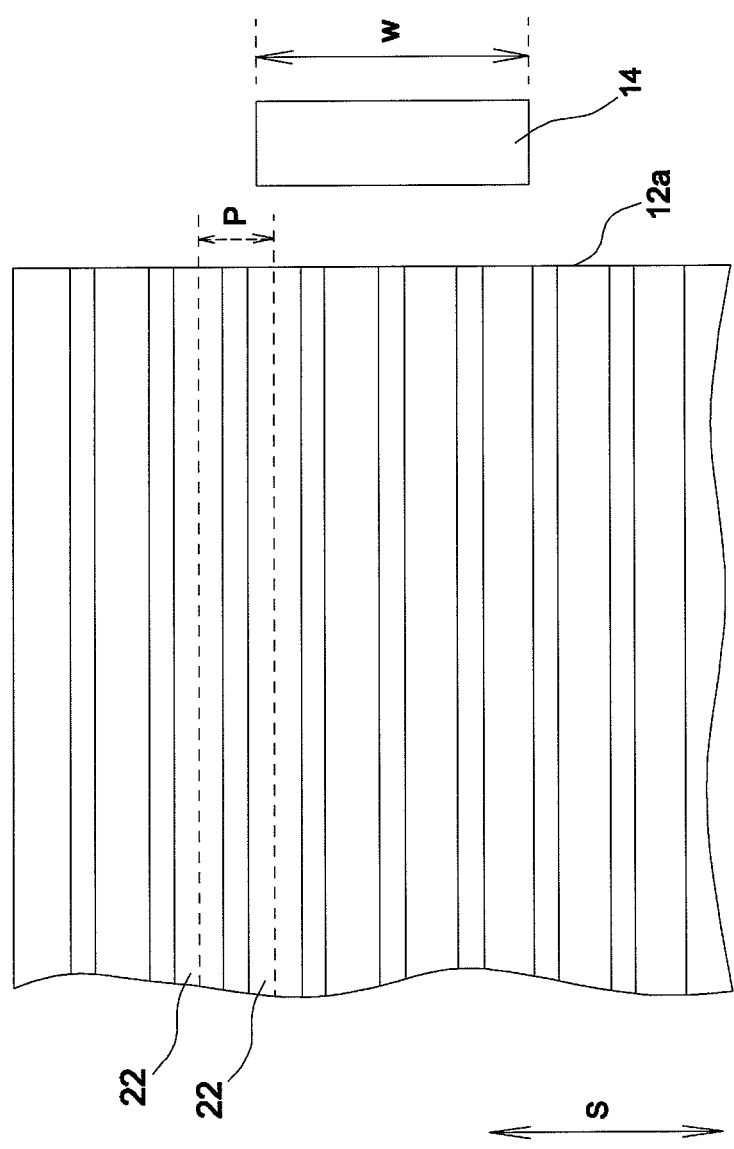
FIG. 3 shows a partial top view of a backlight module according to an embodiment of the invention.

Referring to both FIG. 1 and FIG. 2, a backlight module 10 according to an embodiment of the invention includes a light guide plate 12 and at least one light source 14. The light guide plate 12 is capable of guiding a light beam emitted by the light source 14 and includes at least one light incident surface 12a, a light-emitting surface 12b and a bottom surface 12c. The light incident surface 12a is disposed adjacent to the light source 14, and the light-emitting surface 12b is connected with the light incident surface 12a and forms an angle with the light incident surface 12a. The bottom surface 12c is connected with the light incident surface 12a and disposed opposite the light-emitting surface 12b. Multiple lenticular lenses 22 are arranged on the light-emitting surface 12b in a direction S substantially parallel to the light incident surface 12a, and each two adjacent lenticular lenses 22 are apart from each other by a distance P. In one embodiment, the distance P is measured between respective apexes of two adjacent lenticular lenses 22, and each of the lenticular lenses 22 extends in a direction substantially perpendicular to the light incident surface 12a. Multiple micro dots 24 are formed on the bottom surface 12c, and the micro dots 24 may be formed by ink-jet printing or laser-transferring printing to provide smoother light-deflection surfaces. In this embodiment, as shown in FIG. 3, when a distance between two adjacent lenticular lenses 22 is denoted as P (the distance between respective apexes of two adjacent lenticular lenses 22 in one embodiment), and a maximum width of a light-emitting area of the light source 14 measured in a direction S parallel to the light incident surface 12a is denoted as W, the light guide plate 12, in an embodiment, satisfies the following relation:

$$5 \leq (W/P) \leq 500.$$

Figure 4:
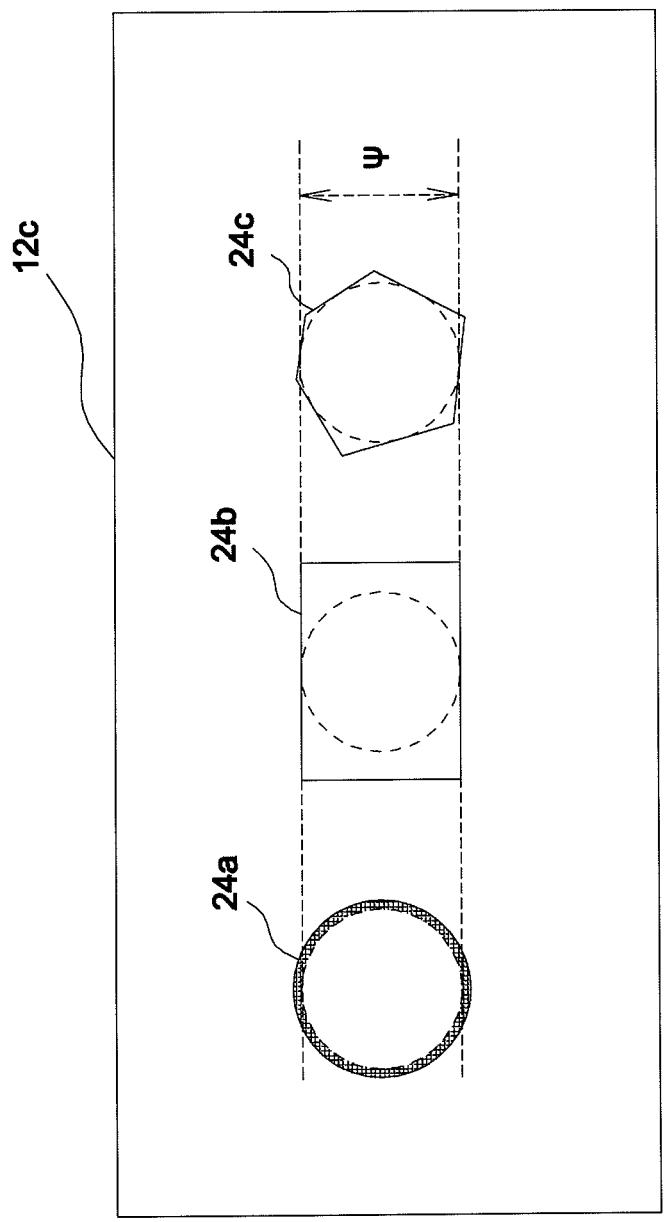
FIG. 4 shows a schematic diagram illustrating different embodiments of micro dots.

Further, as shown in FIG. 4, each of the micro dots 24 is not limited to a specific shape. For example, a projection of a micro dot 24 projecting on the bottom surface 12c of the light guide plate 12 may be in the shape of a circle (micro dot 24a) or a rectangle (micro dot 24b) or may have an irregular shape (micro dot 24c). In this embodiment, when a distance between two adjacent lenticular lenses 22 is denoted as P (the distance between respective apexes of two adjacent lenticular lenses 22 in one embodiment), and an inscribed circle diameter of a projection of each micro dot 24 projecting on the bottom surface 12c of the light guide plate 12 is denoted as ψ, the light guide plate 12, in an embodiment, satisfies the following relation:

$$0.5 \leq )P/\psi) \leq 15.$$

Figure 5:
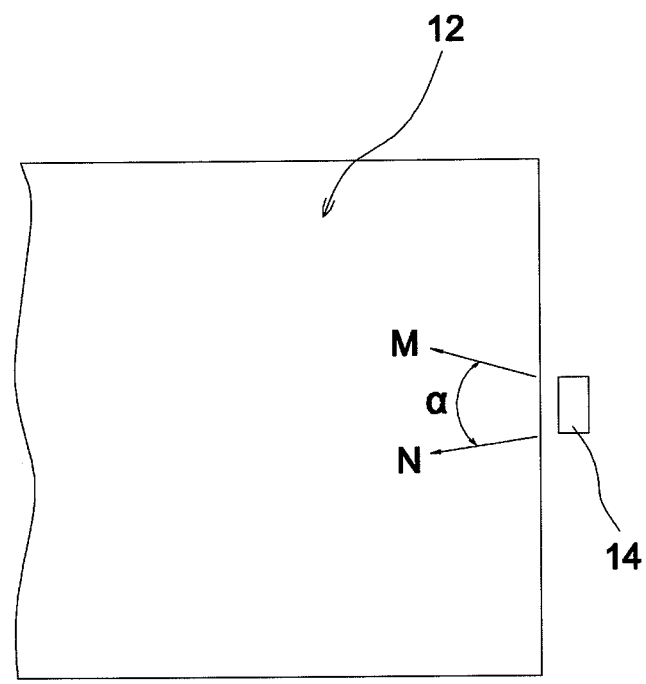
FIG. 5 shows a schematic diagram illustrating a diffusion angle according to an embodiment of the invention.

According to this embodiment, multiple lenticular lenses 22 arranged on the light-emitting surface 12b extend in a direction (light-emitting direction of the light source 14) substantially perpendicular to the light incident surface 12a, and the micro dots 24 are formed by ink-jet printing or laser-transferring printing to provide smoother light-deflection surfaces. Therefore, the directionality of light propagating in the light guide plate 12 is enhanced to reduce light scattering. Under the circumstance, emission of the light source 14 is mostly confined to the front of the light source 14 to reduce the amount of light scattering through sides of the light guide plate 12 and therefore increase light-utilization efficiency. Further, since the directionality of light propagating in the light guide plate 12 is improved to enhance effects of local dimming, the luminance uniformity and image contrast are further increased. The inventor's experimental results show that, according to the above embodiment, a diffusion angle α of a light beam propagating in the light guide plate 12 and emitted by the light source 14 is smaller than 45 degrees. As shown in FIG. 5, the diffusion angle α is defined as an included angle made by two lines M and N, where the line M is connected between the light source 14 and an upper half-intensity position on the light guide plate 12, and the line N is connected between the light source 14 and a lower half-intensity position on the light guide plate 12.

Figure 6:
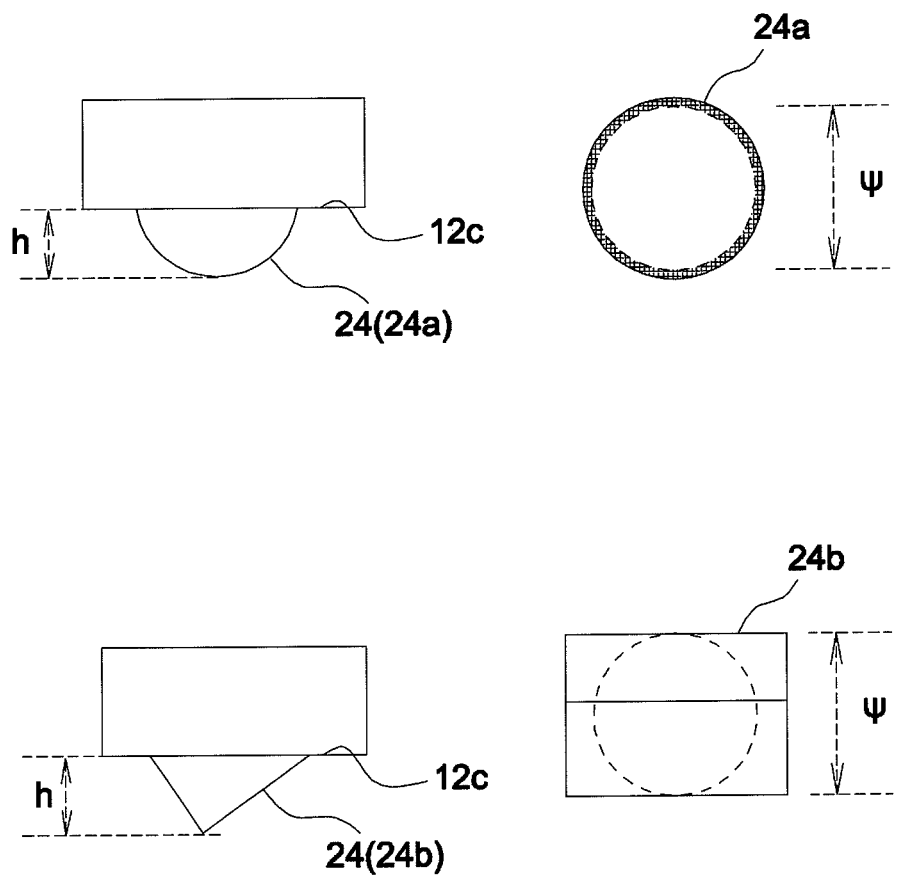
FIG. 6 shows schematic diagrams illustrating different embodiments of micro dots.
Figure 7:
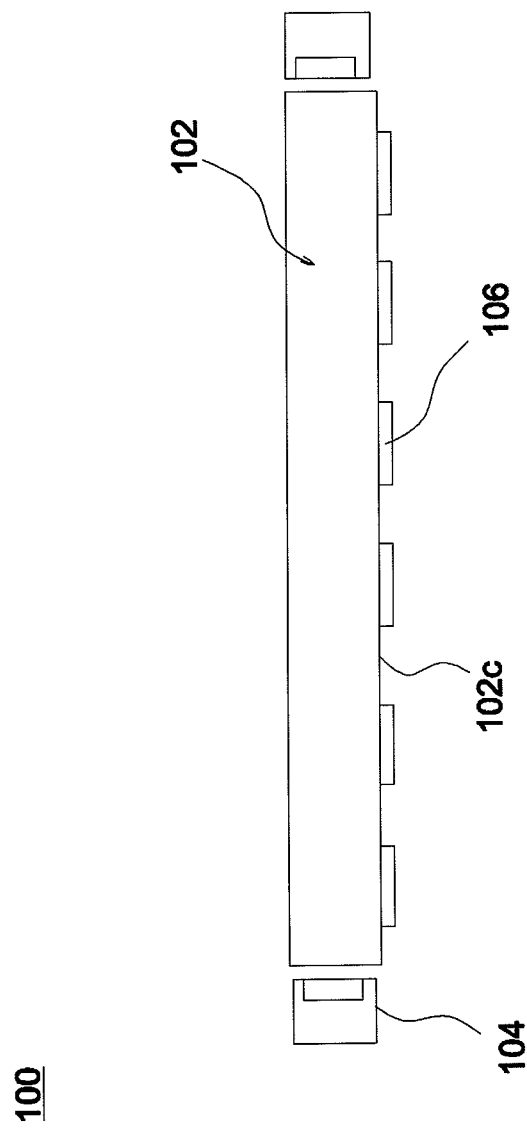
FIG. 7 shows a schematic side view of a conventional backlight module.

In one embodiment, an included angle made by an extending direction of each lenticular lens 22 and a light-emitting direction of the light source 14 is preferably smaller than 10 degrees. Certainly, the extending direction of each lenticular lens 22 is not limited to form a straight line, as long as the directionality of light propagation is allowed to be improved. For example, the lenticular lenses 22 may be disposed in a wavy arrangement, with the extending direction being bent up and down or left and right. Further, each of the lenticular lenses 22 is not limited to a specific shape. For example, as shown in FIG. 2, each of the lenticular lenses 22 may has an arc-shaped cross-section. Alternatively, a cross-section of the lenticular lens 22 may be constructed by multiple straight line segments, multiple curve line segments, or a combination of straight line segments and curve line segments. Further, a surface roughness of the lenticular lenses 22 is preferably smaller than or equal to 0.1 um, and a surface roughness of the micro dots 24 is preferably smaller than or equal to 0.09 um to provide smoother light-deflection surfaces and hence improve the directionality of light propagation. In one embodiment, the distribution densities of micro dots 24 in different areas of the bottom surface 12c may distinct from each other to improve luminance uniformity. As shown in FIG. 6, when a height of each micro dot 24 relative to the bottom surface 12c of the light guide plate 12 is denoted as h, and an inscribed circle diameter of a projection of each micro dot 24 projecting on the bottom surface 12c of the light guide plate 12 is denoted as ψ, the light guide plate 12, in an embodiment, satisfies the following relation:

$$0.08 \leq (h/\psi) \leq 0.4.$$

In conclusion, the backlight module of the embodiments of the invention may have at least one of the following advantages.

According to the above embodiments, multiple lenticular lenses arranged on the light-emitting surface extend in a light-emitting direction of the light source, and the micro dots are formed by ink-jet printing or laser-transferring printing to provide smoother light-deflection surfaces. Therefore, the directionality of light propagating in the light guide plate is enhanced to reduce light scattering. Under the circumstance, emission of the light source is mostly confined to the front of the light source to reduce the amount of light scattering through sides of the light guide plate and therefore increase light-utilization efficiency. Further, since the directionality of light propagating in the light guide plate is improved to enhance effects of local dimming, the luminance uniformity and image contrast are further increased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising:
at least one light source; and
a light guide plate for guiding a light beam emitted by the light source and at least comprising:
at least one light incident surface disposed adjacent to the light source;
a light-emitting surface connected with the light incident surface and forming an angle with the light incident surface;
a bottom surface connected with the light incident surface and disposed opposite the light-emitting surface;
a plurality of lenticular lenses arranged on the light-emitting surface in a direction substantially parallel to the light incident surface, each two adjacent lenticular lenses being apart from each other, and each of the lenticular lenses extending in a direction substantially perpendicular to the light incident surface; and
a plurality of micro dots formed on at least the bottom surface, wherein a distance between two adjacent lenticular lenses is denoted as P, an inscribed circle diameter of a projection of each of the micro dots projecting on the bottom surface is denoted as ψ, a width of a light-emitting area on the light source measured in a direction parallel to a longitudinal direction of the light incident surface is denoted as W, a height of each of the micro dots relative to the bottom surface is denoted as h, and the light guide plate satisfies the following relation:

$$0.08 \leq (h/\psi) \leq 0.4;$$

$$0.5 \leq (P/\psi) \leq 15; \text{ and}$$

$$5 \leq (W/P) \leq 500.$$

2. The backlight module as claimed in claim 1, wherein an included angle made by the extending direction of each of the lenticular lenses and a light-emitting direction of the light source is smaller than 10 degrees.

3. The backlight module as claimed in claim 1, wherein a surface roughness of the lenticular lenses is smaller than or equal to 0.1 um.

4. The backlight module as claimed in claim 1, wherein a surface roughness of the micro dots is smaller than or equal to 0.09 um.

5. The backlight module as claimed in claim 1, wherein the micro dots comprise ink-jet printing dots.

6. The backlight module as claimed in claim 1, wherein the micro dots comprise laser-transferring printing dots.

7. The backlight module as claimed in claim 1, wherein a diffusion angle of the light beam propagating in the light guide plate and emitted by the light source is smaller than 45 degrees.

8. The backlight module as claimed in claim 1, wherein each of the lenticular lenses has an arc-shaped cross-section.

9. The backlight module as claimed in claim 1, wherein distribution densities of the micro dots in different areas of the bottom surface are distinct from each other.

10. The backlight module as claimed in claim 1, wherein the distance between two adjacent lenticular lenses is measured between respective apexes of the two adjacent lenticular lenses.

* * * * *